(12) United States Patent
Müller et al.

(10) Patent No.: US 11,809,948 B2
(45) Date of Patent: Nov. 7, 2023

(54) DETECTION OF AN OPTICAL CODE

(71) Applicant: SICK AG, Waldkirch (DE)

(72) Inventors: Romain Müller, Waldkirch (DE);
Martin Hoegy, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 17/674,359

(22) Filed: Feb. 17, 2022

(65) Prior Publication Data

US 2022/0261566 A1    Aug. 18, 2022

(30) Foreign Application Priority Data

Feb. 18, 2021    (EP) .................................. 21157810

(51) Int. Cl.
| | |
|---|---|
| *G06K 7/10* | (2006.01) |
| *G01S 17/894* | (2020.01) |
| *G01S 17/08* | (2006.01) |
| *H04N 23/56* | (2023.01) |

(52) U.S. Cl.
CPC .......... *G06K 7/10861* (2013.01); *G01S 17/08* (2013.01); *G01S 17/894* (2020.01); *G06K 7/10584* (2013.01); *G06K 7/10831* (2013.01); *H04N 23/56* (2023.01)

(58) Field of Classification Search
CPC ........... G06K 7/10861; G06K 7/10584; G06K 7/10831; G06K 7/10851; G06K 7/10603; G01S 17/08; G01S 17/894; H04N 23/56
See application file for complete search history.

(56) References Cited

U.S. PATENT DOCUMENTS

| | | | |
|---|---|---|---|
| 5,115,121 A | 5/1992 | Bianco et al. | |
| 5,371,361 A | 12/1994 | Arends et al. | |
| 5,504,316 A | 4/1996 | Bridgelall et al. | |
| 6,918,538 B2* | 7/2005 | Breytman | G06K 19/14 |
| | | | 235/462.23 |
| 8,925,814 B1* | 1/2015 | Schneider | G06K 7/10851 |
| | | | 235/462.26 |
| 9,740,903 B2* | 8/2017 | Handshaw | G06K 7/10732 |
| 11,353,560 B2* | 6/2022 | Steinkogler | G06K 7/10702 |

FOREIGN PATENT DOCUMENTS

| | | |
|---|---|---|
| DE | 10 2018 105 301 A1 | 9/2019 |
| EP | 2026249 B1 | 2/2010 |
| WO | 90/13875 A1 | 11/1990 |

OTHER PUBLICATIONS

Search Report dated Aug. 10, 2021 issued in corresponding European Application No. 21157810.9.

* cited by examiner

*Primary Examiner* — Seung H Lee
(74) *Attorney, Agent, or Firm* — Nath, Goldberg & Meyer; Jerald L. Meyer; Morgan D. Rosenberg (57) ABSTRACT

A code scanning device for detecting an optical code on an object in a reading area, comprising a light transmitter for transmitting a reading beam, a deflection unit for periodically deflecting the reading beam over the reading area with a scanning frequency fscan, a light receiver for generating a received signal from the returning reading beam, a distance sensor for detecting a distance d from the object, and a control and evaluation unit configured to read a code content of the optical code on the basis of the received signal and to set the scanning frequency fscan as a function of the distance d.

18 Claims, 3 Drawing Sheets

$$\frac{2m}{x} = \frac{f_{scan}}{f_0}$$

Figure 5

| TA in mm | 200 | 400 | 600 | 800 | 1000 | 1200 |
|---|---|---|---|---|---|---|
| 0 | 8 | 16 | 24 | 31 | 39 | 47 |
| 50 | 24 | 47 | 71 | 94 | 118 | 141 |
| 100 | 39 | 79 | 118 | 157 | 196 | 236 |
| 150 | 55 | 110 | 165 | 220 | 275 | 330 |
| 200 | 71 | 141 | 212 | 283 | 353 | 424 |
| 250 | 86 | 173 | 259 | 345 | 432 | 518 |
| 300 | 102 | 204 | 306 | 408 | 511 | 613 |
| 350 | 118 | 236 | 353 | 471 | 589 | 707 |
| 400 | 134 | 267 | 401 | 534 | 668 | 801 |
| 450 | 149 | 298 | 448 | 597 | 746 | 895 |
| 500 | 165 | 330 | 495 | 660 | 825 | 990 |
| 550 | 181 | 361 | 542 | 722 | 903 | 1084 |
| 600 | 196 | 393 | 589 | 785 | 982 | 1178 |
| 650 | 212 | 424 | 636 | 848 | 1060 | 1272 |
| 700 | 228 | 456 | 683 | 911 | 1139 | 1367 |
| 750 | 243 | 487 | 730 | 974 | 1217 | 1461 |
| 800 | 259 | 518 | 778 | 1037 | 1296 | 1555 |

Figure 6

DETECTION OF AN OPTICAL CODE

The invention relates to a code scanning device and a method for detecting an optical code on an object in a reading area.

Although optical codes can be read by cameras for quite some time, code scanners that scan a barcode in a direction transverse to the code with a laser reading beam are still in use in a variety of forms. One design principle uses a rotating mirror with several mirror facets, so that a limited angular section is detected a plurality of times per rotation over an opening angle corresponding to the number of mirror facets. That kind of rotating mirror is also referred to as a polygon mirror wheel or polygon wheel for short.

Typical applications of code readers are supermarket checkouts, automatic package identification, sorting of postal items, baggage handling in airports and other applications in logistics or factory automation. In many cases, the objects carrying the code, such as components, packages or suitcases, are moved through the reading field of the stationarily mounted code reader. The objects are identified by the attached codes for correct sorting or similar processing steps.

The rotating mirror of a code scanner conventionally rotates at a fixed and constant scanning frequency. However, this leads to the fact that the light-dark transitions in the received signal vary considerably depending on the detection situation for a code that is actually the same. This aspect has not yet been taken into account in the prior art.

EP 2 026 249 B1 discloses a camera-based code reader that acquires rectified images of moving objects with uniform resolution using a line sensor. The line sensor detects the objects successively and line by line during the movement and then assembles the image lines into an overall image. In order to achieve a uniform resolution in the direction of movement, the recording frequency of the line sensor is adjusted depending on the geometry of the objects detected. This has no relation to the scanning frequency of a code scanner, which at best can be said to capture a single image line, which is evaluated individually and not assembled into an image. The scanning frequency of EP 2 026 249 B1 refers to a resolution transverse to this image line, namely in the direction of movement, while the resolution of the respective image line itself is totally fixed by the pixel order of the line camera. A scanning frequency of a periodic scanning with a reading beam is not provided in a camera, the pixels are exposed simultaneously.

DE 10 2018 105 301 A1 discloses a camera having an integrated distance sensor. The distance measurement thereof is used for a variety of setup steps and other improvements. However, it has already been pointed out that there is no scanning frequency of a reading beam in a camera in the first place.

U.S. Pat. No. 5,504,316 discloses a laser scanning system for reading 1D and 2D barcodes. In a first scan, the orientation of the code is determined and subsequently the code is read with a scan pattern adapted to it. This solves the problem that a code can only be read if its reading line crosses all code elements, but does not improve the light-dark transitions for the actual evaluation of the received signal.

It is therefore an object of the invention to improve the reading of codes with a code scanner.

This object is satisfied by a code scanning device for detecting an optical code, in particular a barcode, on an object in a reading area, comprising a light transmitter for transmitting a reading beam, a deflection unit for periodically deflecting the reading beam over the reading area with a scanning frequency $f_{scan}$, a light receiver for generating a received signal from the returning reading beam, a distance sensor for detecting a distance d from the object, and a control and evaluation unit configured to read a code content of the optical code on the basis of the received signal and to set the scanning frequency $f_{scan}$ as a function of the distance d.

The object is also satisfied by a method for detecting an optical code on an object in a reading area, comprising the steps of transmitting a reading beam, periodically guiding the reading beam over the reading area at a scanning frequency $f_{scan}$, generating a received signal from the returning reading beam, detecting a distance d to the object, evaluating the received signal in order to read a code content of the optical code, and setting the scanning frequency $f_{scan}$ as a function of the distance d.

A light transmitter generates the reading beam, preferably with the aid of beam-shaping optics. A deflection unit periodically deflects the reading beam and thus scans the reading area with a scanning frequency $f_{scan}$. A light receiver, again preferably with receiving optics, generates a received signal from the returning reading beam. If the returning reading beam has swept over an optical code, the received signal contains light-dark changes corresponding to the code. A control and evaluation unit reads the code content of the optical code from the received signal using one or more decoding methods that in themselves are known. The code scanning device additionally comprises a distance sensor for determining a distance d from the code scanning device to the object or the optical code.

The invention starts from the basic idea that the scanning frequency $f_{scan}$ has an effect on the module size of the optical code that can still be sufficiently resolved to read the optical code. Therefore, the scanning frequency $f_{scan}$ is adjusted as a function of the distance d, preferably dynamically in operation, possibly adjusted for each code to be read, on the basis of the respective measured distance d. This is because the distance d of the code to be read increases the speed at which the light spot generated by the reading beam moves on the code. It is therefore advantageous to scan objects or codes located further away more slowly than those located close to the code scanning device. Preferably, the scanning frequency $f_{scan}$ is adjusted inversely proportional to the distance d, since said speed of the light spot increases linearly with the distance d. As discussed in the introduction with reference to EP 2 026 249 B1, the scanning frequency $f_{scan}$ of a code scanner should not be confused with the frame rate or recording frequency of a line camera, a line camera has no scanning frequency.

The invention has the advantage of improving the reading rate, i.e. the success rate of reading optical codes for the code scanning device. For a far code, the speed of the scanning light spot, which would otherwise become too high, is reduced and the light-dark transitions are better detected. For near codes, more reading repetitions can be made in the same acquisition time. A conventional fixed scanning frequency would have to either be based on the worst case of a code at the far end of the reading range, or it would have to be accepted that such codes are sometimes no longer readable. According to the invention, an optimal operating point of the scanning frequency $f_{scan}$ can be found dynamically for all distances.

The control and evaluation unit preferably stores a characteristic curve for the relationship of the scanning frequency $f_{scan}$ to be set as a function of the distance d. The control and evaluation unit comprises a corresponding memory for this purpose or has access to a memory. In this context, the term characteristic curve is only intended to refer to the relationship between the two variables; it could also be referred to a curve or a function, which can also be stored discretely and in particular as a table (LUT, lookup table). Throughout this specification, the terms preferably or preferred refer to advantageous, but completely optional features.

The control and evaluation unit preferably is configured to adjust the scanning frequency $f_{scan}$ in dependence on a module size m of the optical code. A module is the smallest element of the code, and the code elements or characters are composed of one or more modules. Thus, a bar in a bar code has a width equal to one or a multiple of a module. The module size is a measure of the extent of the module, and consequently the smaller the module size becomes, the more challenging decoding becomes. Therefore, it is advantageous to adjust the scanning frequency $f_{scan}$ also as a function of the module size m. Because of the dependence of the scanning frequency $f_{scan}$ on the distance d already provided, there is now an overall dependence on the two quantities distance and module size (d, m).

The control and evaluation unit preferably stores at least one characteristic curve for the relationship between the scanning frequency $f_{scan}$ to be set and the distance d and the module size m. With the further parameter module size m, a simple characteristic curve is no longer sufficient to capture the situation, unless the code scanning device is fixedly designed for a specific module size m only. Rather, the characteristic curves now represent the dependency $f_{scan}(d,m)$. It is conceivable that a characteristic curve field is known only for characteristic curves for a certain selection of module sizes m. For intermediate values of the module size, a suitable characteristic curve must then be selected, or interpolation can be performed.

The characteristic curve preferably is determined from a spatial frequency $f_0$ of the light-dark transitions in the received signal as a function of the spacing d and the scanning frequency $f_{scan}$, by means of which pairs of scanning frequency $f_{scan}$ and spacing d are identified in which a desired spatial frequency is reached. The period associated with the spatial frequency $f_0$ is the shortest distance between light and dark still detected in the received signal. Now, in order to determine the characteristic curve or the characteristic field, first the dependence of the spatial frequency $f_0$ on the distance d and the scanning frequency $f_{scan}$ is examined, for example in a table or any other conceivable representation. Then a desired spatial frequency is specified, which is to be achieved, and in the dependence $f_0(d, f_{scan})$ generated in the first step, pairs or interpolation points (d, f scan, scan) are located where this desired spatial frequency is realized within the scope of predeterminable tolerances. Each interpolation point provides a point of a characteristic curve, which can thus be sampled with any desired accuracy. The interpolation points themselves can be stored as a characteristic curve, preferably arranged as a table or discrete function, or a characteristic curve obtained therefrom, for example by interpolation or function fit. Further characteristic curves for other module sizes m can be obtained analogously, with a spatial frequency $f_0$ corresponding to this module size m respectively being considered.

The dependence of the spatial frequency $f_0$ on the distance d and the scanning frequency $f_{scan}$ preferably is determined by the formula $$f_0 = \frac{2\pi d}{Nm} f_{scan}.$$

N denotes the number of mirror surfaces of the deflection unit, in order to also be able to consider a polygon mirror wheel with several facets. However, it can also be a simple mirror with N=1. The other quantities have already been introduced. The distance d can still contain an internal time component, which is neglected here or already taken into account in the distance measurement. Furthermore, the formula uses a spatial frequency $f_0$ given by double the module size 2m. Other factors than two would be conceivable to ensure that a module of module size m is still detected, but this does not matter in any case as long as the desired spatial frequency is also evaluated accordingly. Nevertheless, this illustrates that the dependence of the spatial frequency is only preferably calculated exactly according to the above formula and is generally determined only on the basis of this formula, wherein in particular constant factors such as said factor of two are changed.

The desired spatial frequency preferably is predetermined on the basis of the design of the code scanning device and/or the signal evaluation, in particular on the basis of at least one filter and/or a decoding method. There is not one globally best spatial frequency, this depends on the specific design of the code scanning device, such as the analog filters used or the number of facets of a polygon mirror wheel of the deflection unit, and also on the decoding methods and signal processing methods possibly used therein. Ultimately, the criterion is that codes can be read, which means that data analysis of a large number of read operations can also yield a suitable desired spatial frequency.

The deflection unit preferably comprises a polygon mirror wheel having N mirror faces. As a result, the reading field is scanned N times with one rotation of the deflection unit. Unlike a measuring laser scanner, a limited angular section is sufficient as the field of view for a code scanning device, and thus a polygon mirror wheel can be used to increase the effective scanning frequency quite easily at the same physical speed.

The code scanning device preferably is configured for reading optical codes of a specific module size m. It therefore has a fixed expectation of the module size m and is designed or optimized for this. The module size m is preferably configured, for example in an initial setup process. However, it is also conceivable that the code scanning device automatically sets a suitable module size m, for example to a module size m that occurs particularly frequently in a history of read operations, or to a self-estimated module size. Usually, the module size m is static for a longer operation phase. The adjustment of the scanning frequency $f_{scan}$ remains dynamic, referring to the variable distance d for a fixed module size m, and the appropriate scanning frequency $f_{scan}$ is in particular determined from a characteristic curve $f_{scan}(d, m)$ for the selected fixed m.

The distance sensor preferably is integrated into the code scanning device. This results in a particularly compact design with simple internal data access and significantly simplified assembly. In addition, the mutual alignment of the distance sensor and the code scanning device is known and fixed. The code scanning device with its own permanently installed distance sensor can autonomously perceive its environment.

The distance sensor preferably is an optoelectronic distance sensor, in particular according to a time-of-flight principle. This is very suitable in connection with the optical detection of the larger device. The distance sensor preferably comprises a plurality of avalanche photodiodes operable in Geiger mode. Such avalanche photodiode elements can be particularly easily activated and deactivated by applying a bias voltage above or below the breakdown voltage. In this way, active zones or areas of interest of the distance measurement can be defined.

The distance sensor preferably comprises a plurality of measuring zones for measuring a plurality of distance values. A measurement zone preferably comprises one or more light receiving elements. Each measurement zone is capable of measuring a distance value, so that the distance sensor gains a lateral spatial resolution and can determine an entire height profile. A common distance value can be formed from the multiple distance values as distance d. The common distance value is intended to be representative, and for this purpose a statistical measure such as the mean value is suitable. The common distance value may be based only on certain distance values from a relevant region of the distance measurement. In the case of a conveyor belt application, these could be those measurement zones that are directed towards the respective object coming in, so that distance values can be obtained as early as possible. In case of a manual presentation of objects in the reading area, measuring zones in the center are preferably used instead. For a distance sensor that has only one measurement zone, the only distance value is automatically the common distance value.

The code scanning device preferably is stationarily mounted at a conveyor that conveys objects in a direction of movement. This is a very common application situation. The local and temporal relationships between a distance measurement in a conveying position and image acquisition in a later conveying position are very simple and calculable. For this purpose, only the conveying speed must be parameterized, transferred from a higher-level controller or measured by the code scanning device itself, for example by tracking a height profile.

The distance sensor preferably is arranged and/or aligned in such a way that the distance d is already known before the optical code is scanned with the reading beam. The distance sensor thus, in a way, detects the future. For this purpose, the distance sensor is preferably arranged upstream with respect to the direction of movement and/or correspondingly aligned with the viewing direction opposite to the direction of movement. In this way, the distance d is always known in advance, and the new scanning frequency $f_{scan}$ can be set in time for the actual code scanning.

The method according to the invention can be modified in a similar manner and shows similar advantages. Further advantageous features are described in an exemplary, but non-limiting manner in the dependent claims following the independent claims.

The invention will be explained in the following also with respect to further advantages and features with reference to exemplary embodiments and the enclosed drawing. The Figures of the drawing show in.

Figure 1:
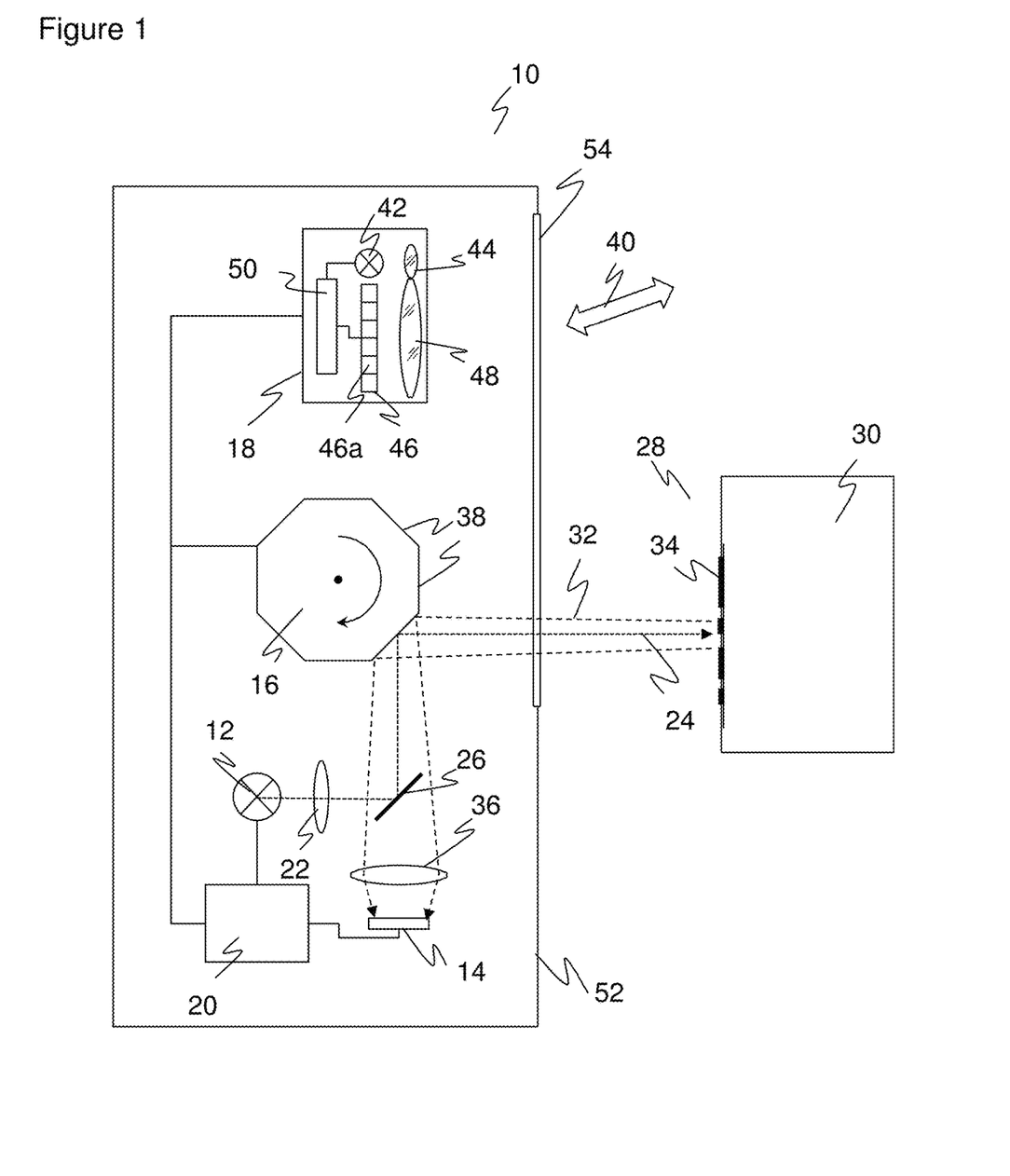
FIG. 1 a schematic representation of a code scanning device.

FIG. 1 shows a schematic representation of a code scanning device 10. In a coarse description, the code scanning device can be divided into three functional groups, namely a transceiver unit shown at the bottom having a light transmitter 12 and a light receiver 14, a deflection unit 16 in the center and a distance sensor 18 at the top. In addition, there are electronic groups, of which only a control and evaluation unit 20 connected to all the functional groups mentioned so far is shown, other electronic groups are not shown and are responsible for tasks such as supply or communication.

The light transmitter 12, for example a laser diode or an LED, generates a light beam referred to as a reading beam 24 by means of transmitter optics 22. The reading beam 24 is deflected a first time at a beam splitter 26 and then again at the deflection unit 16 according to the angular position thereof, and then exits the code scanning device 10 into a reading area 28.

When the reading beam 24 impinges on an object 30, a portion of the light is reflected back to the code scanning device 10 as a returning reading beam 32. The case of interest for a code scanning device 10 is that the reflection occurs at an optical code 34. No linguistic distinction is made here between reflection and the much more common diffuse remission. The returning reading beam 24 is deflected at the deflection unit 16, and a portion transmitting the beam splitter 26 is directed to the light receiver 14 via receiving optics 36. The light receiver, for example a photodiode, an avalanche photodiode (APD, Avalanche Photodiode) or a multiple arrangement thereof, generates a received signal from the incident returning reading beam 32. As in the case of the transmitting optics 22, the receiving optics 36 is shown only schematically as a simple lens, without excluding any other forms of beam-shaping optics known per se for code scanners.

In FIG. 1, the deflection unit 16 is a polygon mirror wheel with N mirror surfaces or mirror facets 38. Alternatively, a simple rotating mirror would also be conceivable. The number N of mirror facets 38, here purely by way of example N=8, corresponds to the detected angular range of the reading range 28, which becomes larger the fewer mirror facets 38 are provided. The deflection unit 16 is caused to rotate at a scanning frequency $f_{scan}$ by a drive which is not shown, i.e. it rotates $f_{scan}$ times per second. The reading area 28 is thereby effectively scanned at a frequency N $f_{scan}$ because of the multiple mirror facets 38.

In addition to detecting optical codes 34, the distance sensor 18 measures a distance d to an object 30. Preferably, this is also based on an optical method, in particular a time of flight (TOF) method. However, other optical and non-optical measurement methods are also conceivable. The distance measuring light signals 40 transmitted and received again for a distance measurement preferably do not impinge at the same location as the reading beam 24, but have an offset due arrangement and/or alignment of the distance sensor 18. This is illustrated in FIG. 1 by tilting and offsetting the arrow of the distance measuring light signals 40, possibly exaggerated. It has advantages in a stationary mounting on a conveyor belt to allow the distance d to be measured in advance, as explained in more detail later with reference to FIGS. 2 and 3. Alternatively, however, it is also conceivable that the distance sensor 18 has at least substantially the same field of view as the light receiver 14 and thus measures the distance d of the optical code 34 when the latter is already in its reading position.

In its preferred embodiment as a TOF sensor, the distance sensor 18 comprises a TOF light transmitter 42 with TOF transmitter optics 44 and a TOF light receiver 46 with TOF receiver optics 48. The distance measurement light signal 40 is thus transmitted and received again. A light time of flight measuring unit 50 determines the time of flight of the distance measuring light signal 40 and, from this, the distance d to the object 30 at which the distance measuring light signal 40 was reflected. The TOF light receiver 46 may comprise a plurality of light receiving elements 46a, which then individually or in smaller groups form measurement zones, each of which is used to determine a single distance value. This provides a height profile, but also a single distance d value can be generated by combination or selecting specific light receiving elements 46a.

The construction of the distance sensor 18 is just an example. Optoelectronic distance measurement using light time of flight methods is well known and therefore will not be discussed in detail. Two exemplary measurement methods are photon mixing detection (PMD) with a periodically modulated distance measurement light signal 40 and pulse time of flight measurement with a pulse-modulated distance measurement light signal 40. There are also highly integrated solutions wherein the TOF light receiver 46 is accommodated on a common chip with the time of flight measurement unit 50 or at least parts thereof, such as TDCs (time-to-digital converters) for time of flight measurements. A TOF light receiver 46 that is configured as a matrix of SPAD light receiving elements 46a (single photon avalanche diode) is particularly suitable. Measurement zones consisting of SPAD light receiving elements 46a can be selectively deactivated and activated by setting the bias voltage below or above the breakdown voltage. Thus, an active range of the distance sensor 18 can be adjusted. The TOF optics 44, 48 are shown only symbolically as respective individual lenses representative of any optics such as a microlens array.

The control and processing unit 20 is shown as a single separate component. However, it may also comprise several building blocks, such as at least one microprocessor, at least one FPGA (Field Programmable Gate Array) and/or at least one ASIC (Application-Specific Integrated Circuit). These digital computing devices are preferably at least partially real-time capable of making various adjustments, such as an autofocus unit for the reading beam 24, 32, which is not shown, or dynamic adjustment of the scanning frequency $f_{scan}$, which is yet to be described. The functionality of the time of flight measuring unit 50 may be at least partially integrated into the control and evaluation unit 20, even if the distance sensor 18 preferably remains autonomous instead and only transmits distances d.

For code reading, the control and evaluation unit 20 evaluates the light-dark transitions of the intensity curve in the received signal of the light receiver 14. Of course, there are light-dark transitions corresponding to the optical code 34 only if there is actually an optical code 34 in the reading area 28. Numerous methods are known per se for decoding optical codes 34, combining, for example, multiple reads and incomplete scans, and will not be discussed in detail here.

Nor are alternative embodiments of the basic structure of a code scanning device 10 of the embodiment shown in FIG. 1 explained, which is to be understood only as an example. In particular, the beam guidance of the reading beam 24, 32 can be effected quite differently in other embodiments, for example by a biaxial structure of light transmitter 12 and light receiver 14 or other deflections, as well as a different design, arrangement and/or orientation of the deflection unit 16. The code scanning device 10 is protected by a housing 52 which is closed off in the front region, where light 24, 32, 40 passes through, by a front window 54 which can alternatively be of multi-part design.

Figure 2:
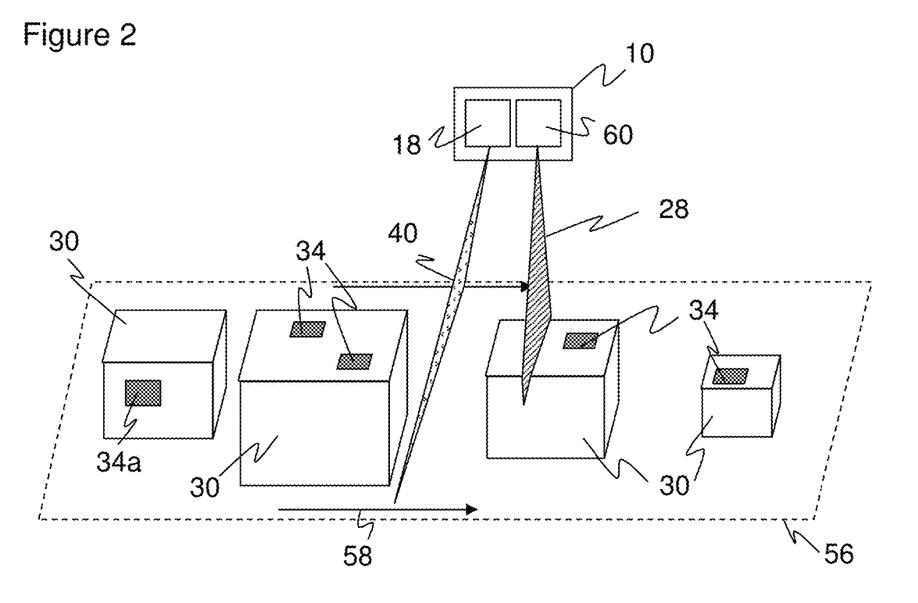
FIG. 2 a view of an exemplary application of a code scanning device in stationary mounting at a conveyor belt.

FIG. 2 shows a possible application of the code scanning device 10 mounted at a conveyor belt 56. The objects 30 with the optical codes 34 are conveyed in the direction of movement 58 indicated by an arrow. In order to also detect side surfaces of the objects 30 and, in particular, laterally attached optical codes 34a, additional code scanning devices 10 not shown can be used from different perspectives.

The code scanning device 10 is shown here only in few simple blocks representing distance sensor 18 with its distance measuring signal 40 and a summarizing code scanning unit 60 that generates the reading area 28 by transmitting the reading beam 24 and receiving the returning reading beam 32. The structure in detail has already been explained with reference to FIG. 1. By its arrangement and orientation, the distance sensor 18 measures a respective distance d to a position upstream the reading area 28 against the direction of movement 58. This is particularly advantageous, but can be varied. Conversely, it is conceivable to arrange the distance sensor 18 even further upstream, which is in that case preferably is an external device connected to the rest of the code scanning device 10 directly or via a controller.

The application at a conveyor belt 56 is only one example. The code scanning device 10 may alternatively be used for other applications, such as at a fixed workstation where a worker holds objects 30 having optical codes 34 in the reading area 28. In that case, the measuring range of the distance sensor 18 set by the distance measuring signal 40 can then coincide with or be closer to the reading range 28, and the distance d is preferably only determined in advance in terms of time. It is conceivable to make the measuring range of the distance sensor 18 variable by selecting measuring zones, and to adapt it according to the application with and without relative movement of objects 30.

FIG. 3 shows again in enlarged form a preferred stationary mounting of the code scanning device 10 at a conveyor that guides objects 30 with optical codes 34 in a direction of movement 58 through its reading area 28. The code scanning device 10 is shown only as one unit, the integrated, mounted or separately arranged distance sensor 18 represented only by its distance measuring light signal 40. The TOF transmitting optics 44 provide an elliptical or linear output profile, so that the measurement area of the distance sensor 18, like the reading area 28 of the code scanning device 10, forms a flat fan with a large output angle in a transverse direction and only a few degrees orthogonal thereto.

Figure 3:
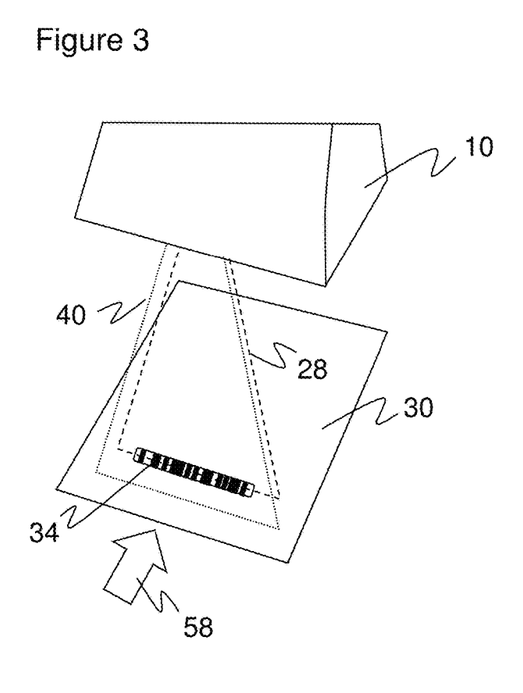
FIG. 3 a three-dimensional detailed view of the mounting of a code scanning device above objects conveyed through its reading field.

Due to an arrangement, alignment and/or adaptation of measuring zones of the distance sensor 18 arranged upstream against the direction of movement 58, the distance d of an object 30 or optical codes 34 is already measured with some head start in time. The distance sensor 18 looks into the future, in a way, and thus the control and evaluation unit 20 can react in time and adapt the code scanning process to the distance d. As already mentioned, a head start in time is not absolutely necessary, in particular in a static reading situation for example with manual presentation of the objects 30 and optical codes 34 or with slow conveying movement or stop-and-go conveying.

According to the invention, the distance d is used to adapt the scanning frequency $f_{scan}$ of the deflection unit 16. This is preferably done in additional dependence on a module size m of the optical codes 34 to be read. Now follows an exemplary derivation of the respective suitable scanning frequency $f_{scan}$.

Figure 4:
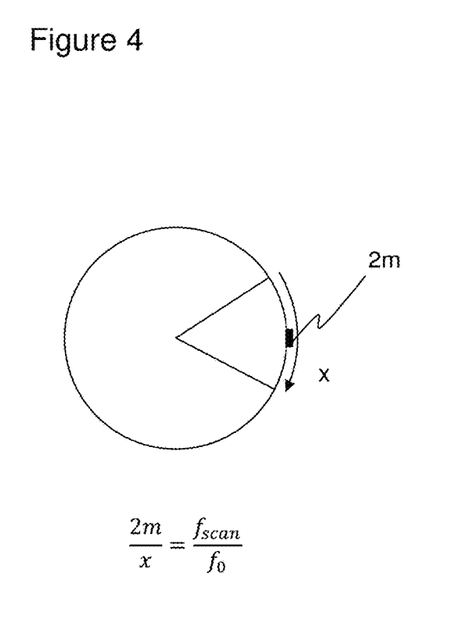
FIG. 4 a sketch illustrating the relationship between a module size m, an area x scanned in each unit of time, a spatial frequency $f_0$ in the received signal, and a scanning frequency $f_{scan}$.

FIG. 4 is a sketch illustrating the relationship between a module size m, an area x scanned in a unit of time, a spatial frequency $f_0$ of the light-dark transitions in the received signal, and the scanning frequency $f_{scan}$. The module size m corresponds to the extent of the smallest code elements, i.e. the bar width of a bar code. The code scanning device 10 must be able to detect a light-dark transition of width 2*m in the received signal during scanning. In other words, the smallest structure that needs to be detected is a bar of module size m, followed by a gap of the same size. This width 2m forms a period of spatial frequency $f_0$. In the received signal, this period 2m thus corresponds to the spatial frequency $f_0$ of the light-dark transitions, which is inversely proportional to it, i.e. it holds that $f_0 \sim 1/2m$. The same inversely proportional relationship also exists between the area x scanned in a unit of time and the scanning frequency $f_{scan}$, thus $x \sim 1/f_{scan}$. Strictly speaking, this is only true for larger distances, d>>x, but this condition is true.

As a first interim result, the summarizing relationship $2m/x = f_{scan}/f_0$ can be derived. The factor two originates from the requirement to be able to just detect the smallest module width m and can therefore still vary to some degree, and this should be an included understanding of the formula without explicit consideration.

This does not yet take into account that the deflection unit 16, in an advantageous design as a polygon mirror wheel, has N mirror facets 38 and thus scans the reading range 28 a plurality of times per revolution. The angular range scanned per mirror facet 38 is $$\frac{2 * 360°}{N}.$$

The factor of two is due to the fact that a beam incident on the mirror facet 38 is reflected according to the rule angle of incidence equals angle of reflection, and thus the scanned angular range is doubled compared to the angular range occupied by the mirror facet 38 itself.

An analogous consideration, now no longer for the entire scanned angular range of a mirror facet 38, but the range x scanned per time unit results in $$x = \frac{4\pi r}{N}.$$

Here r is the radius in which scanning takes place, thus ultimately the distance d, so that essentially r=d holds. Strictly speaking, one would still have to be more exact by using r=TA+IL, where TA is the actual (scanning) distance and IL is an internal light path. The scanning distance TA will reappear later in FIG. 5, but for now r and d are assumed to be equal, and an internal light path IL is neglected. This can be achieved in any case by appropriate calibrations and offsets, should the internal light path IL have a noticeable influence.

The above equation $$\frac{2m}{x} = \frac{f_{scan}}{f_0}$$

can now be solved for $f_0$ and $$x = \frac{4\pi r}{N}$$

and with r=d be inserted:

$$f_0 = \frac{f_{scan} x}{2 m} = \frac{2\pi d}{Nm} f_{scan}.$$

Figure 5:
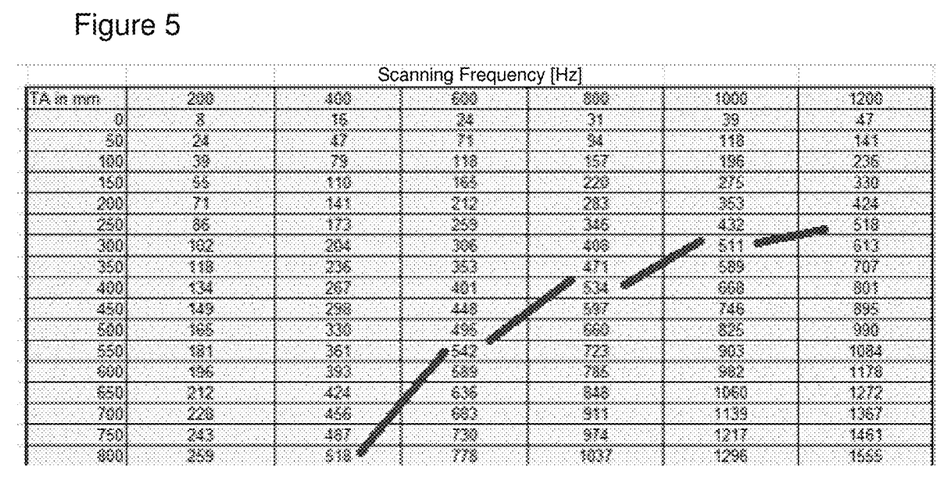
FIG. 5 an exemplary table of the dependence of the spatial frequency $f_0$ on the scanning frequency $f_{scan}$ and a distance to the code (referred to here as TA)

FIG. 5 shows an example of a table with spatial frequencies $f_0$ calculated according to this formula for an exemplarily selected m of 0.5 mm with N=8 mirror facets 38, the individual values being shown in the unit kHz. In the columns of this table, there are various scanning frequencies $f_{scan}$ in the unit Hz, and in the rows there are various scanning distances TA in the unit mm. The relationship between the scanning distance TA and the distance d measured by the distance sensor 18 has already been discussed, it can be considered to be the same with a little simplification. It will be understood that this only illustrates the formula; and any intermediate values could also be generated, as well as similar tables for other m and N.

Now, conversely, for any particular design and configuration of a code scanning device 10, there is a particular spatial frequency $f_0$ which enables optimal code reading. This depends, among other things, on the analog filters used, but also on other characteristics specific to the selected code scanning device 10, of which the code-reading algorithms used shall be mentioned by way of example. The dependence on the analog filters can be understood as follows: The light receiver 14 has a limited bandwidth, and the downstream signal amplification elements and signal pre-processing elements are adapted to this bandwidth. This may include a low pass filtering, or band pass filters or still other filters may be used. The limitation of the frequency band mainly reduces the noise, because the quality of the code reading deteriorates with high noise. A spatial frequency $f_0$ that is selected too low would lead to an unnecessarily high noise component. Moreover, a high scanning frequency $f_{scan}$ is useful, since it is proportional to the spatial frequency, in order to be able to scan a code 34 as many times as possible within a given time in which the code 34 is located in the reading area 28, for example during a relative movement. On the other hand, a spatial frequency $f_0$ chosen too high above the receiver cutoff frequency would provide poor signal quality, in particular with low amplitude and distortion. It is therefore useful to set the desired spatial frequency $f_0$ in the upper range of the receiver bandwidth, where the combination of signal quality, noise and highest possible scanning frequency is optimal.

Assuming, for example, that the spatial frequency $f_0$ particularly suitable for a code scanning device 10 is 500 kHz, the appropriate pairs of values for (m,d) can be found in the rows and columns of the table in FIG. 5. In FIG. 5 this is highlighted by black lines which lie approximately, but not quite, on a diagonal.

These pairs of values (m,d) are supporting points of the desired relation $f_{scan}(m,d)$ that can be used to determine the respective optimum scanning frequency $f_{scan}$ as a function of module size m and distance d. By refining the table, interpolation, function fit and similar measures, the relation $f_{scan}(m,d)$ can be derived with any desired accuracy.

Figure 6:
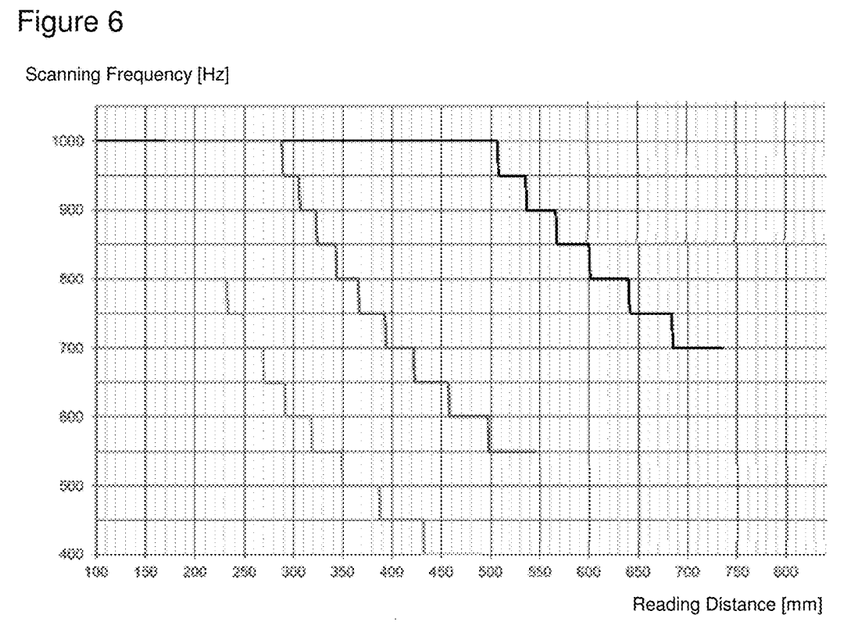
FIG. 6 exemplary characteristic curves for the dependence of the scanning frequency $f_{scan}$ on the reading distance d for different module sizes m, which are derived for example from tables according to FIG. 5.

FIG. 6 shows some examples of $f_{scan}(m,d)$. For each fixed m the relation can be understood as a characteristic curve, and for several m a characteristic curve field results as shown. Here the values m=1 mm, m=0.5 mm as in FIG. 5 and in addition m=0.35 mm were chosen as examples. The steplike curve corresponds to the relatively coarse gradation in the table according to FIG. 5. The steps can be refined, and an at least quasi-continuous curve can also be achieved by interpolation or function fit.

Thus, a code scanning device 10 is advantageously configured for a module size m of the codes 34 to be read. Alternatively, the code scanning device 10 sets itself to a module size m, such as that which occurred particularly frequently during a past operating phase. The control and evaluation unit 20 selects a characteristic curve $f_{scan}(m,d)$ having this module size m. If no characteristic curve is available for the selected m, a characteristic curve with similar m is selected, or interpolation is performed from characteristic curves adjacent with respect to m.

Then, the distance sensor 18 determines the respective distance for the objects 30 and optical codes 34 entering the reading range 28. The control and evaluation unit 20 reads the corresponding scanning frequency $f_{scan}$ (m,d) from the characteristic curve and sets the rotational speed of the drive of the deflection unit 16 accordingly, in particular by regulating its motor voltage to a corresponding value.

Up to now, it has been assumed that the module size m is predefined or possibly determined from a history. It is also conceivable to measure the module size m. In this case, roughly speaking, the actual perceived lengths of the code bars and code gaps as well as the total extent of the code in the scan area are determined. After reading the code, it is known which code bars and code gaps have the module width m. Based on a height profile measured by the distance sensor 18, it is possible to calculate back, taking into account the perspective, how large these code bars and code gaps actually were, and thus the module width m is determined.

An exemplary specific method could proceed as follows: The distance sensor 18 determines the height profile that will be in the reading area 18 with a time offset t corresponding to the arrangement and relative movement. The code scanning device 10 reads the code 34 and determines the position of the code 34 in the reading area 18, as well as the perceived lengths of the code bars and code gaps. After the code 34 is read, it is retrospectively known which code bars and code gaps have the minimum module width m, as well as the total module length of the code with all its code bars and code gaps. From the internal perceived length counter, it is possible to determine the time $t_m$ during which a module width m is scanned, or a time tan for two module widths, or a time $t_{Code}$ for the entire code. In particular it holds that $f_0=1/t_{2m}$. With a perspective transformation from the position of the code 34 to the height profile detected with a time offset $\Delta t$, the distance d to the code 34 is obtained. Knowing d and $f_0$, the module width m can be calculated by converting the formula $f_0=2\pi d/Nm\ f_{scan}$ because the formula otherwise contains only known constants or the known number N of mirror facets.

Thus, the module size m is known and, as explained with reference to FIGS. 5 and 6, the appropriate characteristic curve can now be used to adjust the scanning frequency $f_{scan}$. In particular, this procedure would detect when the module size m decreases, and the scanning frequency $f_{scan}$ could be decreased somewhat to compensate. The procedure is not limitless. If, for example, a completely unsuitable scanning frequency $f_{scan}$ is set, that does not at all allow to read a code, then no module width m can be determined in this way, which in turn is a prerequisite for finding the suitable scanning frequency $f_{scan}$. If, however, the parameters were set sensibly at the beginning, drifts and moderate changes in the module size m can still be taken into account. Care should also be taken with sloped objects 30, as a sloped roof surface will fool the code reading device 10 into thinking that the module width m is smaller. However, the distance sensor 18 could detect this via a height profile, so this case is adequately accounted for. Moreover, from the point of view of the code reading device 10, the module size m is actually changed, and in this respect the slope does not even cause any mismatch. However, it should be noted if there is interest in the actual module size m, for example for a plant operator.

A module size m determined by the code scanning device 10 may in itself be a relevant quantity for the system operator, in particular in the form of statistics of the module sizes m occurring. Typically, a reading device is designed for a certain minimum module size, for example m=0.2 mm. Now, if the module size falls below this minimum module size, in particular creeping from 0.2 mm to 0.19 mm, 0.18 mm, etc., a corresponding warning is helpful. Then it is possible to react to scan freqfalling below the minimum module size, for example by informing the code generation, such as the printer, in order to anticipate a failure or a degradation of the read rate. A corresponding set-up or maintenance aid of the code scanning device 10 can process and display the data, so that an even more comprehensive diagnosis is possible and, in particular, it is detected at an early stage whether the device is being operated at the limit or only slightly above the limit of its specification.

The invention claimed is:

1. A code scanning device for detecting an optical code on an object in a reading area, comprising:
   a light transmitter for transmitting a reading beam;
   a deflection unit for periodically deflecting the reading beam over the reading area with a scanning frequency $f_{scan}$;
   a light receiver for generating a received signal from a returning reading beam;
   a distance sensor for detecting a distance d from the object; and
   a control and evaluation unit configured to read a code content of the optical code on the basis of the received signal and further configured to set the scanning frequency $f_{scan}$ as a function of the distance d.

2. The code scanning device according to claim 1, wherein the optical code is a barcode.

3. The code scanning device according to claim 1, wherein a characteristic curve for the relationship of the scanning frequency $f_{scan}$ to be set as a function of the distance d is stored in the control and evaluation unit.

4. The code scanning device according to claim 3, wherein the characteristic curve is determined from a spatial frequency $f_0$ of the light-dark transitions in the received signal as a function of the spacing d and the scanning frequency $f_{scan}$, by means of which pairs of scanning frequency $f_{scan}$ and spacing d are identified in which a desired spatial frequency is reached.

5. The code scanning device according to claim 4, wherein the dependence of the spatial frequency $f_0$ on the distance d and the scanning frequency $f_{scan}$ is determined by the formula $f_0=2\pi d/Nm\, f_{scan}$ (scan where N is a number of mirror surfaces of the deflection unit.

6. The code scanning device according to claim 4, wherein the desired spatial frequency is predetermined on the basis of at least one of the design of the code scanning device and the signal evaluation.

7. The code scanning device according to claim 6, wherein the desired spatial frequency is predetermined on the basis of at least one filter or a decoding method.

8. The code scanning device according to claim 1, wherein the control and evaluation unit is configured to adjust the scanning frequency $f_{scan}$ in dependence on a module size m of the optical code.

9. The code scanning device according to claim 8, wherein at least one characteristic curve for the relationship between the scanning frequency $f_{scan}$ to be set and the distance d and the module size m is stored in the control and evaluation unit.

10. The code scanning device according to claim 1, wherein the deflection unit comprises a polygon mirror wheel having N mirror faces.

11. The code scanning device according to claim 1, wherein the code scanning device is configured for reading optical codes of a specific module size m.

12. The code scanning device according to claim 1, wherein the distance sensor is integrated into the code scanning device.

13. The code scanning device according to claim 1, wherein the distance sensor is an optoelectronic distance sensor.

14. The code scanning device according to claim 1, wherein the distance sensor is configured to measure distances according to a time-of-flight principle.

15. The code scanning device according to claim 1, wherein the code scanning device is stationarily mounted at a conveyor that conveys objects in a direction of movement.

16. The code scanning device according to claim 15, wherein the distance sensor is at least one of arranged and aligned such that the distance d is already known before the optical code is scanned with the reading beam.

17. A method for detecting an optical code on an object in a reading area, comprising the steps of:
transmitting a reading beam with a light transmitter;
periodically guiding the reading beam over the reading area with a deflection unit at a scanning frequency $f_{scan}$;
generating a received signal with a light receiver from a returning reading beam;
detecting a distance d to the object with a distance sensor;
evaluating the received signal in order to read a code content of the optical code; and
setting the scanning frequency $f_{scan}$ as a function of the distance d.

18. A code scanning device for detecting an optical code on an object in a reading area, comprising:
a light transmitter for transmitting a reading beam;
a deflection unit for periodically deflecting the reading beam over the reading area with a scanning frequency $f_{scan}$;
a light receiver for generating a received signal from a returning reading beam;
a distance sensor for detecting a distance d from the object; and
a control and evaluation unit configured to read a code content of the optical code on the basis of the received signal and further configured to set the scanning frequency $f_{scan}$ as a function of the distance d,
wherein the code scanning device is stationarily mounted at a conveyor that conveys objects in a direction of movement, and
wherein the distance sensor is at least one of arranged and aligned such that the distance d is already known before the optical code is scanned with the reading beam.

* * * * *

UNITED STATES PATENT AND TRADEMARK OFFICE
CERTIFICATE OF CORRECTION

PATENT NO. : 11,809,948 B2
APPLICATION NO. : 17/674359
DATED : November 7, 2023
INVENTOR(S) : Romain Müller and Martin Hoegy It is certified that error appears in the above-identified patent and that said Letters Patent is hereby corrected as shown below:

In the Claims

Claim 5, Column 13, Line 6, please delete the phrase "(scan".

Signed and Sealed this
Twenty-sixth Day of December, 2023

Katherine Kelly Vidal
*Director of the United States Patent and Trademark Office*